US011227382B2

(12) United States Patent
Nefian et al.

(10) Patent No.: US 11,227,382 B2
(45) Date of Patent: Jan. 18, 2022

(54) CHANGE DETECTION SYSTEM

(71) Applicant: Intelinair, Inc., Champaign, IL (US)

(72) Inventors: Ara Victor Nefian, San Francisco, CA (US); Hrant Khachatryan, Yerevan (AM); Hovnatan Karapetyan, Yerevan (AM); Naira Hovakymian, Champaign, IL (US)

(73) Assignee: Intelinair, Inc., Champaign, IL (US)

( * ) Notice: Subject to any disclaimer, the term of this patent is extended or adjusted under 35 U.S.C. 154(b) by 29 days.

(21) Appl. No.: 16/245,743

(22) Filed: Jan. 11, 2019

(65) Prior Publication Data

US 2019/0213731 A1  Jul. 11, 2019

Related U.S. Application Data

(60) Provisional application No. 62/616,159, filed on Jan. 11, 2018.

(51) Int. Cl.
| | | |
|---|---|---|
| *G06T 7/00* | (2017.01) | |
| *G06T 7/11* | (2017.01) | |
| *G06T 7/136* | (2017.01) | |
| *G06K 9/62* | (2006.01) | |
| *G06T 5/00* | (2006.01) | |
| *G06T 5/20* | (2006.01) | |
| *G06T 5/50* | (2006.01) | |
| *G06K 9/00* | (2006.01) | |
| *G06T 7/73* | (2017.01) | |
| *G06T 7/10* | (2017.01) | |

(52) U.S. Cl.
CPC .......... *G06T 7/001* (2013.01); *G06K 9/00657* (2013.01); *G06K 9/6212* (2013.01); *G06T 5/002* (2013.01); *G06T 5/20* (2013.01); *G06T 5/50* (2013.01); *G06T 7/0002* (2013.01); *G06T 7/0012* (2013.01); *G06T 7/10* (2017.01); *G06T 7/11* (2017.01); *G06T 7/136* (2017.01); *G06T 7/74* (2017.01); *G06T 2207/10024* (2013.01); *G06T 2207/10032* (2013.01); *G06T 2207/20021* (2013.01); *G06T 2207/30188* (2013.01)

(58) Field of Classification Search
CPC ......... G06T 7/001; G06T 7/0012; G06T 7/74; G06T 7/10; G06T 5/002; G06T 5/20; G06T 5/50; G06T 7/0002; G06T 7/11; G06T 7/136; G06T 2207/10024; G06T 2207/20021; G06T 2207/10032; G06T 2207/30188; G06K 9/6212; G06K 9/00657
See application file for complete search history.

(56) References Cited

U.S. PATENT DOCUMENTS

| | | | |
|---|---|---|---|
| 10,728,528 B2 * | 7/2020 | Haimovitch-Yogev | ..................... G06T 7/11 |
| 2012/0033862 A1 * | 2/2012 | Wang | ...................... G06T 7/187 382/128 |
| 2014/0049491 A1 * | 2/2014 | Nagar | .................. G06K 9/4642 345/173 |
| 2014/0176726 A1 * | 6/2014 | Millward | ........... H04N 5/23258 348/169 |

(Continued)

*Primary Examiner* — Bobbak Safaipour
(74) *Attorney, Agent, or Firm* — KCO Legal, Inc.

(57) ABSTRACT

A change detection system including an image analysis unit that analyzes an image gathered from an image gathering unit, a change detection unit that detects changes in a plurality of images taken over a predetermined time, where the change detection unit modifies the image to indicate areas where a change has occurred.

14 Claims, 3 Drawing Sheets

(56) References Cited

U.S. PATENT DOCUMENTS

| | | | |
|---|---|---|---|
| 2014/0270344 A1* | 9/2014 | Krishnamoorthi | G06K 9/6211 382/103 |
| 2016/0307599 A1* | 10/2016 | Snell | H04N 21/4331 |
| 2017/0034986 A1* | 2/2017 | Koch | A01B 79/02 |
| 2018/0070527 A1* | 3/2018 | Richt | A01B 79/005 |
| 2018/0357517 A1* | 12/2018 | Gandenberger | G06K 9/0063 |
| 2019/0073534 A1* | 3/2019 | Dvir | H04W 4/185 |
| 2019/0213414 A1* | 7/2019 | Nefian | G06T 7/11 |
| 2019/0266401 A1* | 8/2019 | Nefian | G06K 9/00657 |
| 2020/0143844 A1* | 5/2020 | Lawlor | G11B 27/3081 |

* cited by examiner

CHANGE DETECTION SYSTEM

CROSS REFERENCE TO RELATED APPLICATIONS

This application is a non-provisional patent application that claims the benefit of and the priority from U.S. Provisional Patent Application No. 62/616,163, filed Jan. 11, 2018, titled CHANGE DETECTION SYSTEM.

BACKGROUND OF THE INVENTION

The agriculture industry comprises a large portion of the world's economy. In addition, as the population of the world increases annually, more food must be produced by existing agricultural assets. In order to increase yields on existing plots of farm land, producers require a clear understanding of plant and soil conditions. However, as a single farm may encompass hundreds of acres, it is difficult to access the conditions of the farm land.

Currently, farmers rely on their observations of their land along with prior experience to determine the requirements to increase the yield of their farm land. These observations may include identifying locations of weeds, identifying plant illnesses and determining levels of crop damage. However, considering the large number of acres in the average farm, these observations are not a reliable method to increase yields. Therefore, a need exists for system that will allow a farmer to better understand the conditions of their farm land.

SUMMARY OF THE INVENTION

Systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

One embodiment of the present disclosure includes a change detection system including an image analysis unit that analyzes an image gathered from an image gathering unit, a change detection unit that detects changes in a plurality of images taken over a predetermined time, where the change detection unit modifies the image to indicate areas where a change has occurred.

In another embodiment, the change detection unit calculates a normalized differential vegetation index for each image gathered.

In another embodiment, the change detection unit calculates a soil adjusted vegetation index for each image gathered.

In another embodiment, the change detection unit separates each image into a plurality of tiles of a predetermined size.

In another embodiment, an Otsu binary thresholding is applied to each pixel in each tile and a mask is applied to each tile based on the Otsu binary thresholding.

In another embodiment, the change detection unit performs a pixel by pixel comparison of each tile.

In another embodiment, the change detection unit performs a Gaussian blur to each tile.

In another embodiment, the change detection unit applies a local statistics method to each tile.

In another embodiment, each tile is a square.

In another embodiment, n each square is 25 pixels by 25 pixels.

Another embodiment of the present disclosure includes a change detection unit including a processor and a memory with a program being executed in the memory, the program performing the steps of analyzing an image gathered from an image gathering unit, detecting changes in a plurality of images taken over a predetermined time via a change detection unit, where the change detection unit modifies the image to indicate areas where a change has occurred.

Another embodiment includes the step of calculating a normalized differential vegetation index for each image gathered.

Another embodiment includes the step of calculating a soil adjusted vegetation index for each image gathered.

Another embodiment includes the step of separating each image into a plurality of tiles of a predetermined size.

Another embodiment includes the step of applying an Otsu binary thresholding to each pixel in each tile and applying a mask to each tile based on the Otsu binary thresholding.

Another embodiment includes the step of performing a pixel by pixel comparison of each tile.

Another embodiment includes the step of performing a Gaussian blur to each tile.

Another embodiment includes the step of applying a local statistics method to each tile.

In another embodiment, each tile is a square.

In another embodiment, each square is 25 pixels by 25 pixels.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE INVENTION

Figure 1:
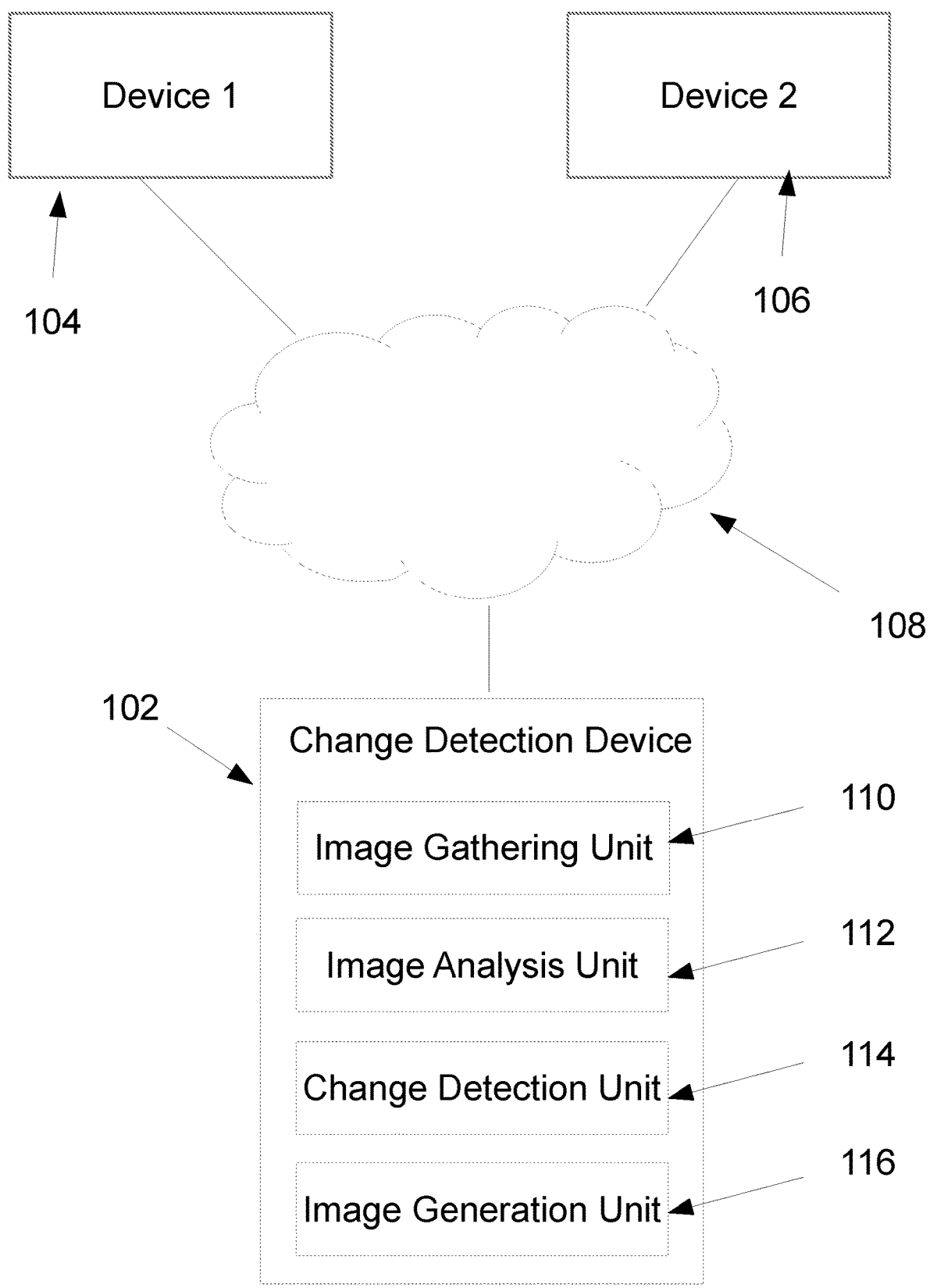
FIG. 1 depicts one embodiment of a change identification system consistent with the present invention.

Referring now to the drawings which depict different embodiments consistent with the present invention, wherever possible, the same reference numbers will be used throughout the drawings and the following description to refer to the same or like parts.

The change identification system 100 gathers medium to low resolution images gathered from an aircraft flying above 1,500 feet. Each image is then partitioned into equally sized tiles. Each tile is analyzed to identify objects within the tile. Adjacent tiles are then compared to identify similar objects in adjacent tiles. The tiles are saved overtime and compared with earlier saved tiles to identify changes in objects identified in the tiles. By comparing tiles over a predetermined time, a history of a specific region can be analyzed. Further, when external information such as soil properties and seed information is incorporated into the analysis, a detailed view of the effectiveness of different agriculture methods can be rated and reviewed.

FIG. 1 depicts one embodiment of a change identification system 100 consistent with the present invention. The change identification system 100 includes a change identification device 102, a communication device 1 104, a communication device 2 106 each communicatively connected via a network 108. The change identification system 100 further includes an image gathering unit 110, an image analysis unit 112, a change detection unit 114 and an image generation unit 116.

The image gathering unit 110 and image analysis unit 112 may be embodied by one or more servers. Alternatively, each of the change detection unit 114 and image generation unit 116 may be implemented using any combination of hardware and software, whether as incorporated in a single device or as a functionally distributed across multiple platforms and devices.

In one embodiment, the network 108 is a cellular network, a TCP/IP network, or any other suitable network topology. In another embodiment, the change identification device 102 may be servers, workstations, network appliances or any other suitable data storage devices. In another embodiment, the communication devices 104 and 106 may be any combination of cellular phones, telephones, personal data assistants, or any other suitable communication devices. In one embodiment, the network 102 may be any private or public communication network known to one skilled in the art such as a local area network ("LAN"), wide area network ("WAN"), peer-to-peer network, cellular network or any suitable network, using standard communication protocols. The network 108 may include hardwired as well as wireless branches. The image gathering unit 112 may be a digital camera.

Figure 2:
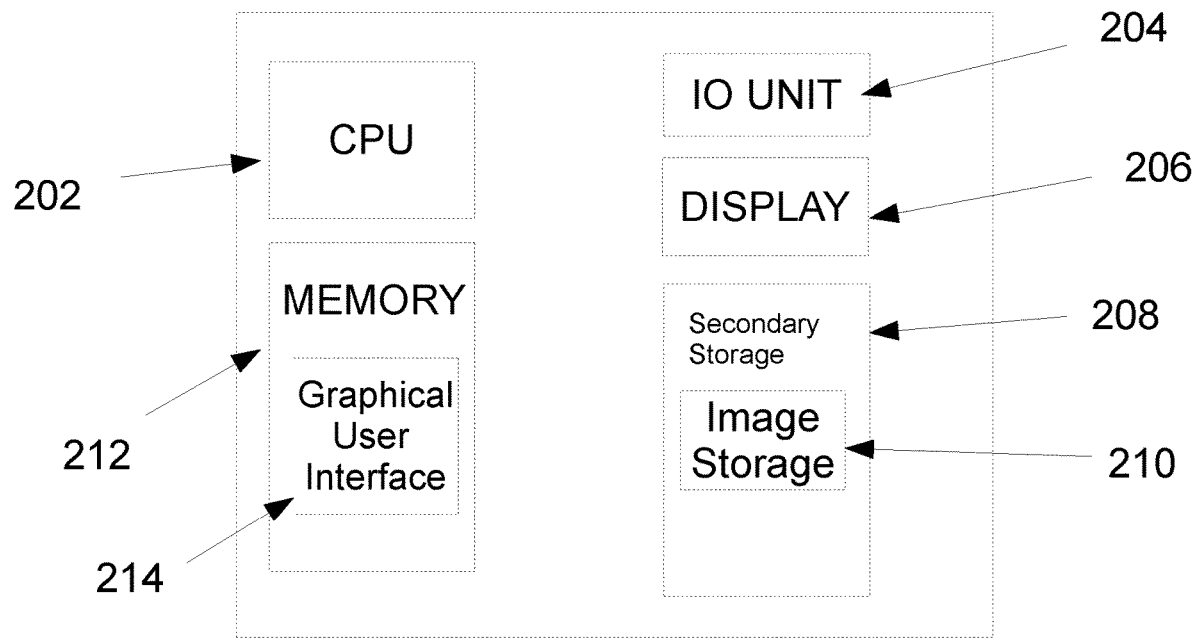
FIG. 2 depicts one embodiment of a change detection unit.

FIG. 2 depicts one embodiment of a change detection unit 102. The change identification device 102 includes a network I/O device 204, a processor 202, a display 206 and a secondary storage 208 running image storage unit 210 and a memory 212 running a graphical user interface 214. The image gathering unit 112, operating in memory 208 of the change detection unit 102, is operatively configured to receive an image from the network I/O device 204. In one embodiment, the processor 202 may be a central processing unit ("CPU"), an application specific integrated circuit ("ASIC"), a microprocessor or any other suitable processing device. The memory 212 may include a hard disk, random access memory, cache, removable media drive, mass storage or configuration suitable as storage for data, instructions, and information. In one embodiment, the memory 208 and processor 202 may be integrated. The memory may use any type of volatile or non-volatile storage techniques and mediums. The network I/O line 204 device may be a network interface card, a cellular interface card, a plain old telephone service ("POTS") interface card, an ASCII interface card, or any other suitable network interface device. The change detection unit 114 may be a compiled program running on a server, a process running on a microprocessor or any other suitable port control software.

Figure 3:
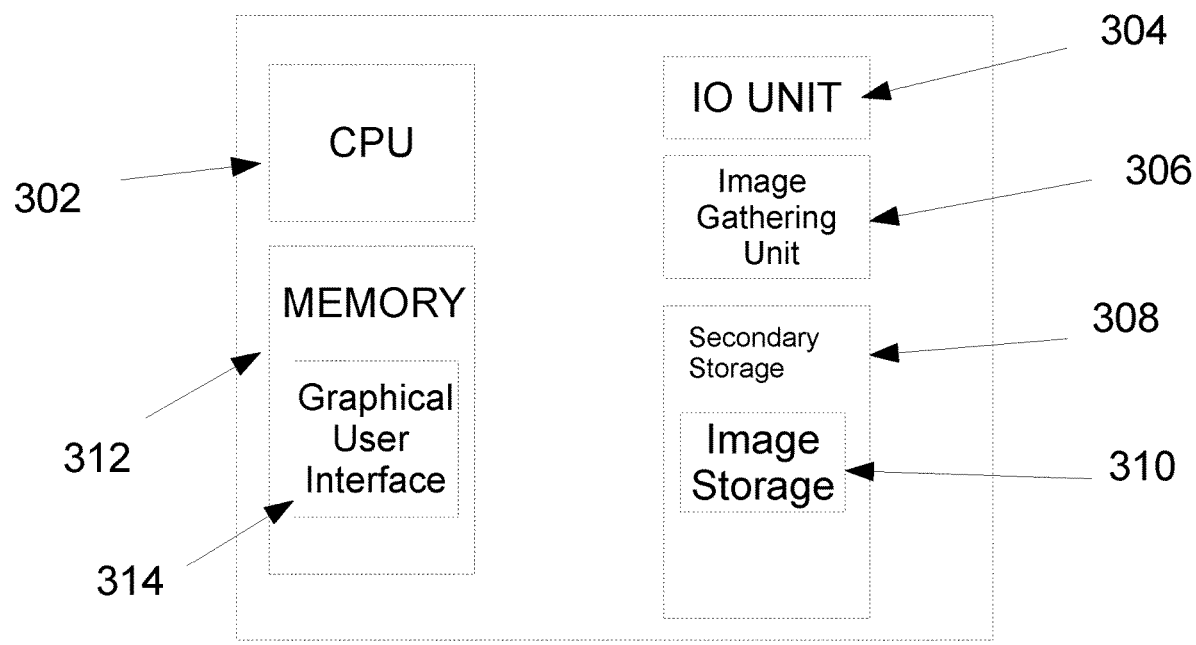
FIG. 3 depicts one embodiment of a communication device consistent with the present invention.

FIG. 3 depicts one embodiment of a communication device 104/106 consistent with the present invention. The communication device 104/1106 includes a processor 302, a network I/O Unit 304, an image capture unit 306, a secondary storage unit 308 including an image storage device 310, and memory 312 running a graphical user interface 314. In one embodiment, the processor 302 may be a central processing unit ("CPU"), a application specific integrated circuit ("ASIC"), a microprocessor or any other suitable processing device. The memory 312 may include a hard disk, random access memory, cache, removable media drive, mass storage or configuration suitable as storage for data, instructions, and information. In one embodiment, the memory 312 and processor 302 may be integrated. The memory may use any type of volatile or non-volatile storage techniques and mediums. The network I/O device 304 may be a network interface card, a plain old telephone service ("POTS") interface card, an ASCII interface card, or any other suitable network interface device.

In one embodiment, the network 108 may be any private or public communication network known to one skilled in the art such as a Local Area Network ("LAN"), Wide Area Network ("WAN"), Peer-to-Peer Network, Cellular network or any suitable network, using standard communication protocols. The network 108 may include hardwired as well as wireless branches.

Figure 4:
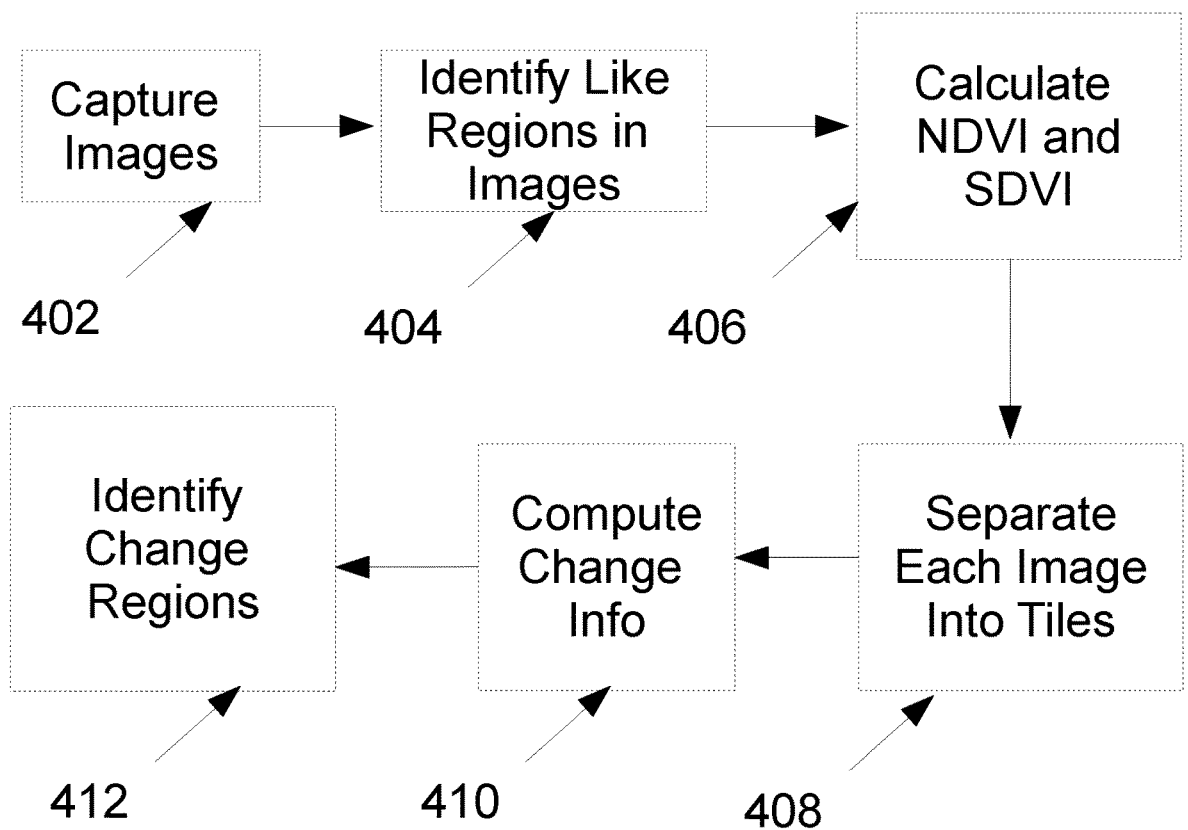
FIG. 4 depicts a schematic representation of a process used to identify changes in the conditions of agricultural assets.

FIG. 4 depicts a schematic representation of a process used to identify changes in the conditions of agricultural assets. In step 402, a first image is captured at a first time by the image gathering unit 112. The image may be captured using any conventional methods of capturing a digital image. In one embodiment, the image is a high resolution raw image. A period of time is allowed to elapse and then a second image is gathered of the same size and content as the first image at a different time. In step 404, the image analysis unit 114 identifies common location markers in each image. The common location markers maybe Geo-Location tags in the images.

In step 406, the image analysis unit calculates the normalized differential vegetation (NDVI) and the soil adjusted vegetation (SAVI) for each image. The NDIV is calculated based on the near field channel (between 800 nm and 850 nm) and the red channel of each image (between 650 nm and 680 nm) using the following equation:

$$NDVI = \frac{NIR - RED}{NIR + RED}$$

The SAVI is determined using the following equation:

$$SAVI = \frac{NIR - RED}{(NIR + RED + L)(1 + L)}$$

Where L=0.5.

In step 408, each of the images is separated in to fixed size, non-overlapping tiles. In one embodiment, each tile is 25 pixels by 25 pixels. In step 410, an Otsu binary thresholding is performed on each tile in each image with the highest value of the Otsu output representing vegetation. Using the Otsu output, a vegetation mask is generated for each pixel with pixels not assigned to vegetation being assigned a value of 0, and pixels having vegetation begin assigned their corresponding value in the original image.

In step 412, the vegetation segmented mask is used to determine the change in the image. In one embodiment, the change is determined by performing a pixel by pixel comparison incorporating the following equation:

change$(x,y)$=image2$(x,y)$−image1$(x,y)$

In another embodiment, the change is determined by performing a pixel by pixel analysis after a Gaussian blurring is applied to each image using the following equation:

GaussiansBlue(image2$(x,y)$−image1$(x,y)$)

In another embodiment, a local statistics method is incorporated using the following equation:

$$\text{change}(x, y) = \frac{\text{image2}(x, y) - \mu(x, y)}{\sigma(x, y)}$$

Based on this equation at first for every pixel (x,y) in the first image the mean µ(x,y) and standard deviation σ(x,y) are calculated in a box surrounding the pixel. Then the change image is calculated according the above equation. In one embodiment, the box size is given in the configuration file. In step 412, the changed regions are detected based on a comparison of the processed images. Once the areas where change has occurred are identified, the area of change can be marked on each image using any known method of marking a digital image.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed:

1. A change detection system including:
   an image analysis unit configured to analyze an image gathered from an image gathering unit affixed to an airplane or drone;
   a change detection unit configured to detect changes in a plurality of images taken over a predetermined time, wherein,
   the change detection unit separates each image into a plurality of tiles of a predetermined size,
   an Otsu binary thresholding is applied to each pixel in each tile,
   a vegetation mask having an analog value greater than 0 is assigned to each pixel based on the Otsu binary thresholding with pixels not assigned to vegetation being assigned a value of 0, and
   the image analysis unit is configured to perform a pixel by pixel analysis of each pixel with a vegetation mask greater then 0 in each tile and to compare each pixel to a corresponding pixel stored over a predetermined period of time to determine a deviation in each pixel over time, and
   the change detection unit modifies the image to indicate areas where a change has occurred.

2. The change detection system of claim 1, wherein the change detection unit calculates a normalized differential vegetation index for each image gathered.

3. The change detection system of claim 1, wherein the change detection unit calculates a soil adjusted vegetation index for each image gathered.

4. The change detection system of claim 1, wherein the change detection unit performs a Gaussian blur to each tile.

5. The change detection system of claim 1, wherein the change detection unit applies a local statistics method to each tile.

6. The change detection system of claim 1, wherein each tile is a square.

7. The change detection system of claim 6, wherein each square is 25 pixels by 25 pixels.

8. A change detection unit including a processor and a memory with a program being executed in the memory, the program performing the steps of:
   analyzing an image gathered from an image gathering unit;
   separating by the change detection unit each image into a plurality of tiles of a predetermined size,
   applying an Otsu binary thresholding to each pixel in each tile,
   assigning a vegetation mask having an analog value greater than 0 to each pixel based on the Otsu binary thresholding with pixels not assigned to vegetation being assigned a value of 0, and
   performing a pixel by pixel analysis of each pixel with a vegetation mask greater then 0 in each tile and compare each pixel to a corresponding pixel stored over a predetermined period of time to determine a deviation in each pixel over time
   wherein the change detection unit modifies the image to indicate areas where a change has occurred.

9. The method of claim 8, including the step of calculating a normalized differential vegetation index for each image gathered.

10. The method of claim 8, including the step of calculating a soil adjusted vegetation index for each image gathered.

11. The change detection system of claim 8, wherein the change detection unit performs a Gaussian blur to each tile.

12. The change detection system of claim 8, wherein the change detection unit applies a local statistics method to each tile.

13. The change detection system of claim 8, wherein each tile is a square.

14. The method of claim 13, wherein each square is 25 pixels by 25 pixels.

\* \* \* \* \*